(12) United States Patent
Ramaraj et al.

(10) Patent No.: US 12,439,113 B2
(45) Date of Patent: ***Oct. 7, 2025

(54) UNIFIED PROGRAM LISTING OF CONTENT TRANSMITTED USING DIFFERENT DISTRIBUTION TYPES

(71) Applicants: DISH NETWORK L.L.C., Englewood, CO (US); DISH Network Technologies India Private Limited, Bangalore (IN)

(72) Inventors: Jayaprakash Ramaraj, Bangalore (IN); Girish Reddivari, Bangalore (IN); Shailesh Deshmukh, Foster City, CA (US); Edward Galbraith, Draper, UT (US); James Davis, Salem, UT (US); Satheesh Haryhara Iyer, South Jordan, UT (US)

(73) Assignees: DISH Network L.L.C., Englewood, CO (US); DISH Network Technologies India Private Limited, Bangalore (IN)

( * ) Notice: Subject to any disclaimer, the term of this patent is extended or adjusted under 35 U.S.C. 154(b) by 15 days.

This patent is subject to a terminal disclaimer.

(21) Appl. No.: 18/349,039

(22) Filed: Jul. 7, 2023

(65) Prior Publication Data

US 2024/0007695 A1    Jan. 4, 2024

Related U.S. Application Data

(63) Continuation of application No. 17/498,604, filed on Oct. 11, 2021, now Pat. No. 11,729,449, which is a continuation of application No. 16/593,334, filed on Oct. 4, 2019, now Pat. No. 11,172,245.

(51) Int. Cl.
    *H04N 21/262*    (2011.01)
    *H04N 21/482*    (2011.01)
    *H04N 21/84*     (2011.01)

(52) U.S. Cl.
    CPC ... *H04N 21/26283* (2013.01); *H04N 21/4821* (2013.01); *H04N 21/4828* (2013.01); *H04N 21/84* (2013.01)

(58) Field of Classification Search
    CPC ......... H04N 21/26283; H04N 21/4821; H04N 21/4828; H04N 21/84
    See application file for complete search history.

(56) References Cited

U.S. PATENT DOCUMENTS

| | | |
|---|---|---|
| 7,761,892 B2 | 7/2010 | Ellis et al. |
| 11,172,245 B2 | 11/2021 | Ramaraj et al. |
| 2003/0229898 A1* | 12/2003 | Babu ...................... G06Q 30/02 348/E7.071 |
| 2007/0061835 A1* | 3/2007 | Klein .................. H04N 21/6581 348/E7.075 |
| 2009/0044233 A1* | 2/2009 | Brandt ............... H04N 21/6581 725/87 |
| 2010/0319017 A1* | 12/2010 | Cook ..................... H04N 5/907 725/100 |
| 2012/0221498 A1 | 8/2012 | Kaszynski et al. |

(Continued)

*Primary Examiner* — Michael R Telan
(74) *Attorney, Agent, or Firm* — Perkins Coie LLP

(57) ABSTRACT

A technique is described for generating a unified list (e.g., a list ribbon) of programs from a variety and disparate channels, the list for display on an over-the-top (OTT) client device. As an example, the unified list can be generated from OTT channels and from over-the-air OTA and/or Advanced Television Systems Committee (ATSC) channels.

20 Claims, 10 Drawing Sheets

(56) References Cited

U.S. PATENT DOCUMENTS

| | | |
|---|---|---|
| 2015/0074725 A1 | 3/2015 | Hale et al. |
| 2016/0323633 A1* | 11/2016 | Jin ..................... H04N 21/4135 |
| 2017/0171564 A1* | 6/2017 | Swaminathan ........ H04N 19/91 |
| 2017/0280196 A1 | 9/2017 | Thomas et al. |
| 2017/0289638 A1* | 10/2017 | Mok ........................ H04N 5/44 |
| 2020/0221049 A1* | 7/2020 | Vermes .............. H04N 21/4622 |
| 2022/0030293 A1 | 1/2022 | Ramaraj et al. |

* cited by examiner

FIG. 2

UNIFIED PROGRAM LISTING OF CONTENT TRANSMITTED USING DIFFERENT DISTRIBUTION TYPES

CROSS-REFERENCE TO RELATED APPLICATIONS

This patent application is a continuation of U.S. patent application Ser. No. 17/498,604, filed on Oct. 11, 2021, entitled "UNIFIED PROGRAM LISTING OF CONTENT TRANSMITTED USING DIFFERENT DISTRIBUTION TYPES," which is a continuation of U.S. patent application Ser. No. 16/593,334, filed on Oct. 4, 2019, entitled "UNIFIED PROGRAM LISTING OF CONTENT TRANSMITTED USING DIFFERENT DISTRIBUTION TYPES," which are incorporated herein by reference in their entirety.

BACKGROUND

Presently, users have available to them a wide variety of options for viewing media. For example, a user can view live channels on their digital device, such as a smartphone, tablet, or smart televisions. As well, the user can view live programs over the internet, such as through cable subscriptions. Further, the user can choose to record a program or choose to schedule a recording of a program for future consumption. Also, the user can choose to record a live broadcast for future consumption. However, currently, the user is required to navigate and employ different devices and applications, depending on which option the user desires.

BRIEF DESCRIPTION OF THE DRAWINGS

FIG. 2 is a sample screen shot of an exemplary electronic program guide UI showing the combined list of the OTT and OTA channels, according to an embodiment.

DETAILED DESCRIPTION

Techniques that integrate an over-the-air DVR (OTA DVR) that may be locally stored (LS) with an over-the-top internet television service (OTT) are provided. For illustrative purposes, an example of an OTA LS DVR is AirTV by AirTV L.L.C, a wholly owned subsidiary of DISH DBS Corporation, Englewood, CO and an example of an OTT is Sling Television (commonly known as SlingTV) by Sling TV L.L.C., Meridian, CO, parent company Dish Network.

Often a generic streaming application which gathers its video source from different cloud or local servers (for example but not limited to OTT live channels, local OTA live channels, video-on-demand, recordings on the cloud server, recordings on the local server, and so on) has the problem of listing the content to the end user in a unified view. The problem is due to the gathering of metadata information from multiple and disparate sources and waiting for such sources to respond to a display request. Specifically, the end user waits for the system to sort the metadata information in accordance with the user-preferred option before even displaying to the end user. Similarly, the search feature also may need to collect information from various sources and unify such collected data locally before displaying the search result to the end user. It has been found that some of the streaming player platform may not be powerful enough to unify the search results in the order of user preference in real time. Such streaming player platform limitation may lead to poor user experience due to latency and possible data inconsistencies, such as for example when any of the sources failed to respond in time, such as by returning the search result to the end user.

Thus, an embodiment of the innovations includes a common cloud system and service which aggregates the metadata from various cloud and local servers and applicable service information. The common cloud service responds to the generic streaming application request for pulling such unified metadata and lists the content to the end user in a unified view. The innovation provides a solution to the problem of the generic streaming application being capable of unifying the disparate metadata and sorting such disparate metadata in user preferred order locally.

In an embodiment, the solution described above can be implemented for a single, combined OTT and OTA channel list ribbon for live channels as well as for both cloud OTT DVR and local OTA DVR recordings, such as for example in a SlingTV/AirTV product.

An embodiment provides a hybrid approach implementation. The hybrid approach enables the client device (e.g., SlingTV clients) to have a unified user Interface for displaying and managing both the cloud or remote server(s) OTT DVR and the local server OTA DVR, thereby providing a seamless user experience. In an embodiment, the remote and the local DVRs are distinguished and are represented on the user interface (UI) display with different icons to identify the source of recording.

Figure 1:
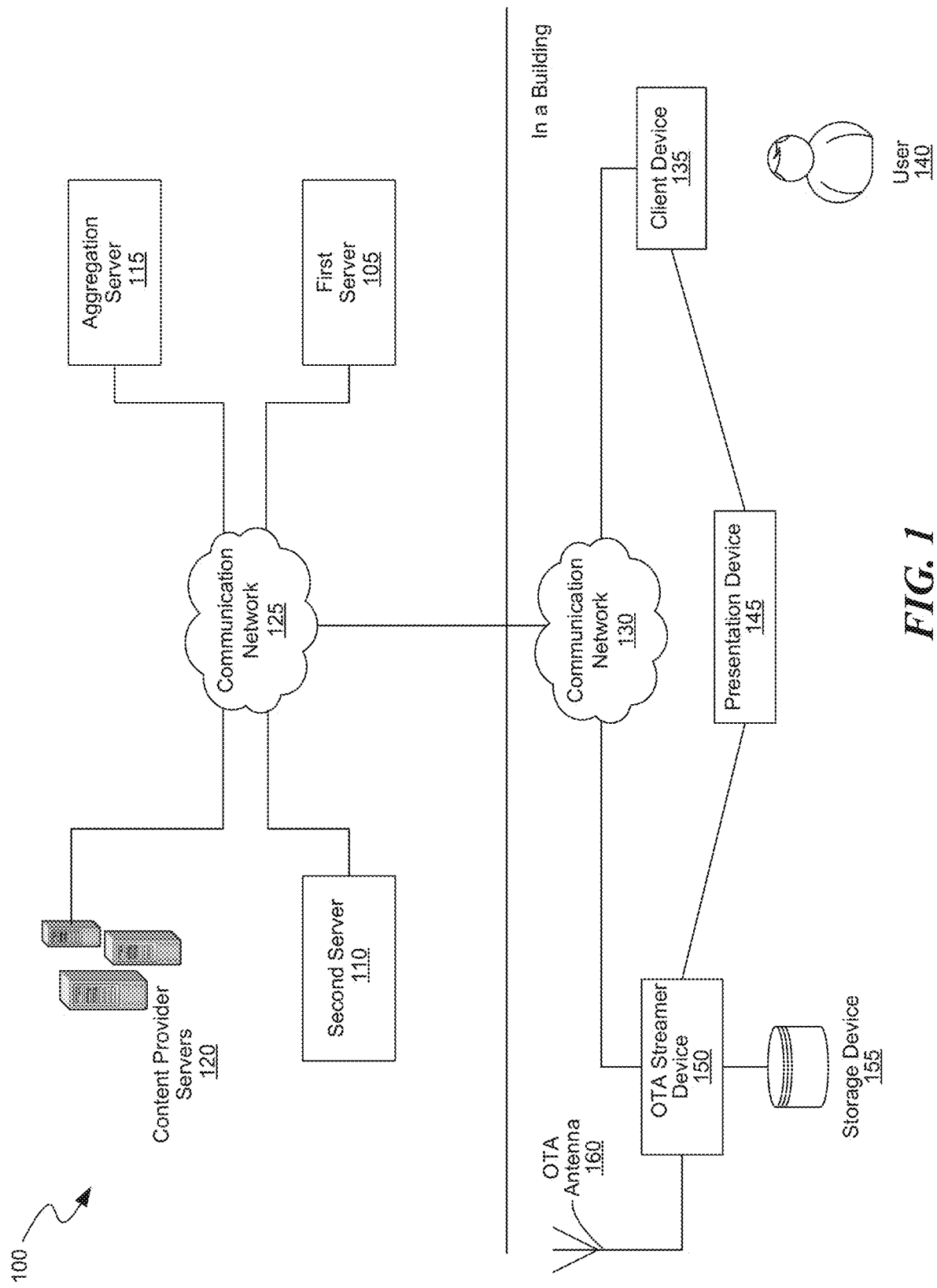
FIG. 1 is a schematic diagram showing a logical system architecture, in accordance with an embodiment.

An embodiment can be understood with reference to FIG. 1, a schematic diagram showing a logical system architecture 100. A user 140 has a client device 135 (e.g., a smartphone, a tablet, a television, a computer, game console, etc.) on which executes an OTA application (e.g., a SlingTV application). Client device 135 is communicably connected to a presentation device 145. Presentation device 145 can be the logical component that displays the UI to the screen of client device 135. As shown, presentation device 145 is logically connected to an OTA streamer device 150, such as for example the AirTV box component. Presentation device 145, which receives signals through client device 135, receives signals from AirTV box to convert such signals into UI on the screen of client device 135. In some cases, devices 135 and 145 are each a single device such as a mobile device, tablet, etc. OTA Streamer Device 150 streams OTA channel AV data to Client device 135. Communicably attached to OTA streamer device 150 is an OTA antenna 160. Thus, by OTA antenna 160, OTA streamer device 150 receives live television (TV) signals. In an embodiment, as OTA streamer device 150 receives the live TV signals, OTA streamer device 150 can near simultaneously show or live stream the TV show corresponding to received signals or can store such signals in a storage device 155, to which OTA streamer device 150 is communicably attached. In an embodiment, each of the components discussed above (client device 135, presentation device 145, OTA streamer device 150 with OTA antenna 160, and storage device 155) can be local, for example, in the same building. Nevertheless, in other embodiments, one or more of the components may reside in a remote location, yet, the grouping of these components may be considered local. For instance, storage device 155 could actually reside at another location (e.g., in the cloud) and still be considered the local storage for OTA streamer device 150. Client device 135 and OTA streamer device 150 each communicate with remote components (e.g., in the cloud) through a local communications network 130. Communication network 130 can be a single network or can be a logical single network that represents a combination of networks achieving the same result. For example, client device 135 and OTA streamer device 150 might each communicate with appropriate components of the innovation in the cloud, but through different network, for example, based on their physical location in the same building.

In an embodiment, communication network 130 is communicably connected with components in the cloud via a network shown as communication network 125. As with communication network 130, communication network 125 can be a single network or can be a logical single network that represents a combination of networks achieving the same result. A cloud DVR backend server is represented by first server 105. In an embodiment, DVR backend server 105 is configured to provide DVR related functionality, such as but not limited to: create/delete the local DVR profile for the user; merge the local and remote DVR records and return a unified recording list; create a new recording event as a future recording in the local DVR database or storage; update existing future recording states (e.g., recording-in-progress, complete) intended for the local DVR database; and delete the recordings from the local DVR database. DVR backend server 105 is communicably connected via communication network 125 with an aggregation server 115. Aggregation server 115 aggregates the metadata from the various cloud and local servers and their respective service information to create unified metadata that can be pulled from the end user's device (e.g., client device 135). Aggregation server 115 is configured to list the media content to the end user in a unified view. Aggregation server 115 helps overcome the problem of the generic streaming application by unifying the metadata so that such unified data can be sorted in user-preferred order locally, as described in detail hereinbelow. While aggregation server 115 is shown as a separate component, it should be appreciated that such depiction is a logical depiction as is not meant to be limiting. For example, aggregation server 115 can reside within or be a part of first server 105. In an embodiment, a second server 110 is communicably connected first server 105 via communication network 125. In an embodiment, OTA streamer device 150 updates its recordings, schedules, and other information to first server 105 through second server 110. In an embodiment, second server 110 is a Compartmented Mode Workstation (CMW). This process keeps the DVR backend up to date with the local changes, as described in further detail hereinbelow. Also depicted are the content provider servers 120 that source the media content such as video and audio. Content provider servers 120 represent, but are not limited to, content from OTT and on-demand channels.

Figure 2:
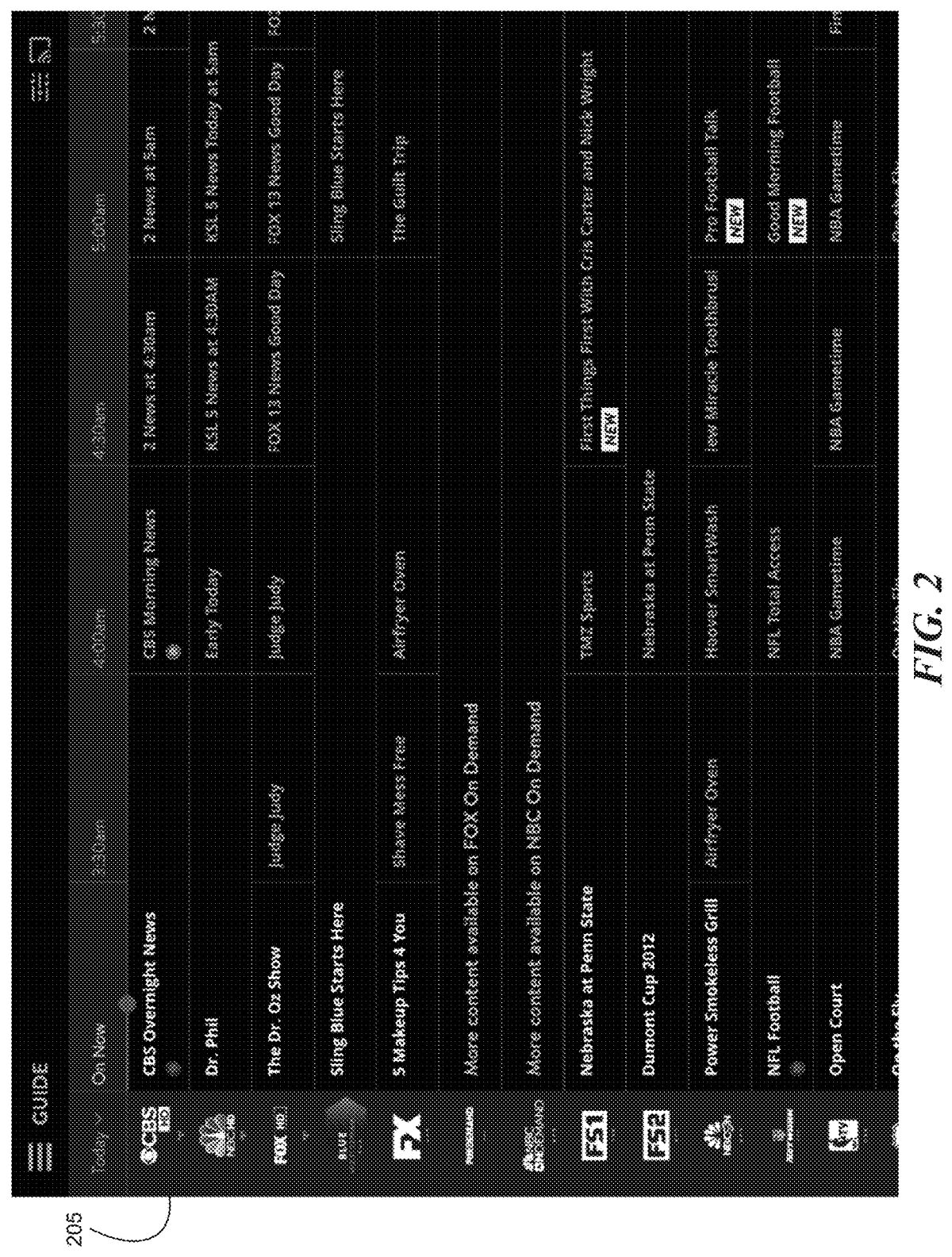

An embodiment can be understood with reference to FIG. 2, a sample screen shot 205 of an exemplary electronic program guide UI showing the combined list of the OTT and OTA channels. For instance, the list includes a program from an OTA channel, CBS Overnight News. In accordance with embodiments herein, when the source of the program is OTA, an indicator, such as a visual shape, is added by the system to the electronic program guide (EPG) UI. For instance, in FIG. 2 under each of the channel logos, CBS HD, NBC HD, and FOX HD, is an antenna shape or icon, indicating that each of these channels are sourced over the air. It should be appreciated that other indicators, such as an auditory notifier (e.g., a chime tone), are contemplated. In FIG. 2, it is presumed that if the antenna icon is not present, then the source of the content is OTT or on-demand. However, other embodiments may include an OTT and/or on-demand visual or auditory indicator or even haptic, as well.

Further, FIG. 2 shows that the OTA program "CBS Overnight News" and the OTT program "NFL Football" are being recorded, as each has a circle-type icon or mark underneath their respective names. Thus, the innovation enables recording of OTA and OTT programs simultaneously. In an embodiment, the OTT recording is stored in the cloud on the storage of first server 105 and the OTA recording is stored locally in storage device 155.

Figure 3:
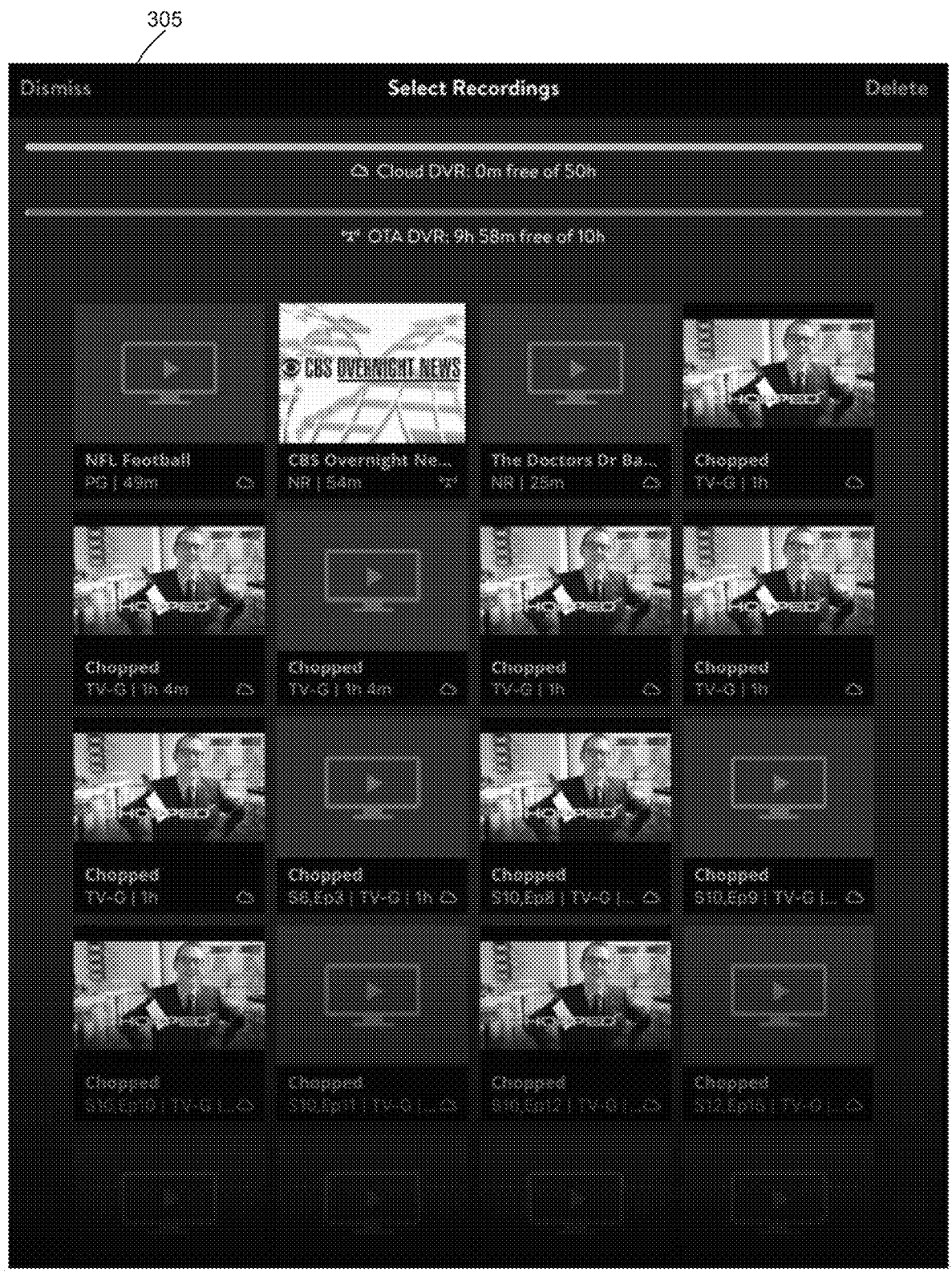
FIG. 3 is a sample screen shot 305 of an exemplary electronic program guide UI showing how an end user can manage their OTT and OTA recordings, according to an embodiment.

An embodiment can be understood with reference to FIG. 3, a sample screen shot 305 of an exemplary DVR recording gallery/tiles showing how an end user can manage their OTT and OTA recordings. The cloud OTT DVR and local OTA DVR storage information are clearly displayed. In this example, a cloud icon is displayed to the left of the Cloud DVR storage information and an antenna icon is displayed to the left of the OTA DVR storage information, for illustrative purposes. Similarly, in this embodiment, the antenna icon or the cloud icon is displayed in each thumbnail, as appropriate, depending on whether the source content is from the OTA channel or the OTT channel, respectively.

Figure 4:
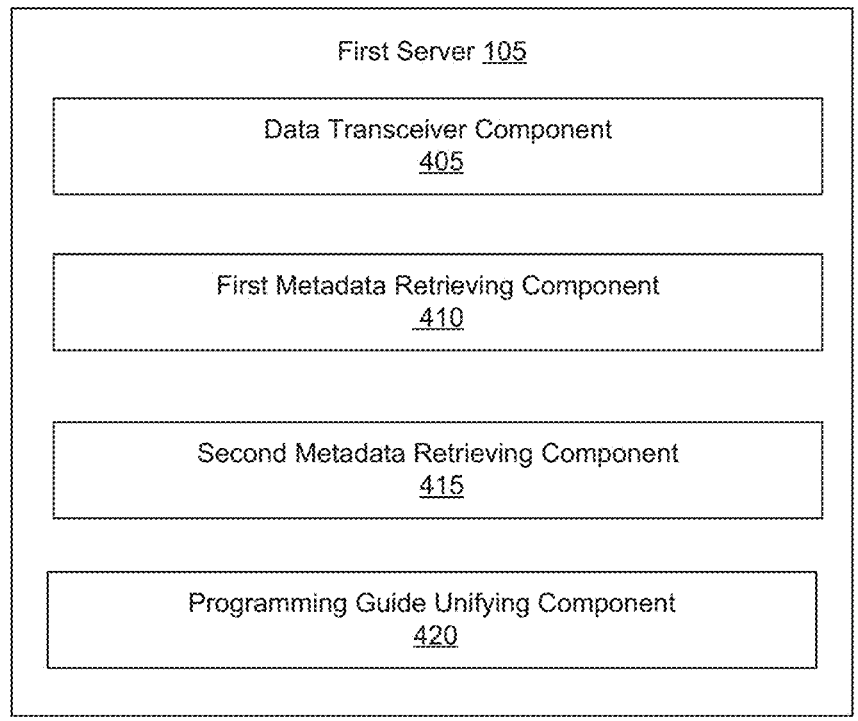
FIG. 4 is a schematic diagram showing the components of first server 105, according to an embodiment.

An embodiment can be understood with reference to FIG. 4, a schematic diagram showing the components of first server 105. First server 105 includes a data transceiver component 405 that is configured to transmit and receive signals. For example, data transceiver 405 may receive signals from second server 110 that originated at OTA streamer device 150. As another example, data transceiver 405 may receive signals from content provider servers 120. As yet another example, data transceiver 405 may send signals intended for presentation device 145. As yet another example, data transceiver 405 may send signals to aggregation server 115.

First server 105 also includes a first metadata retrieving component 410 and a second metadata retrieving component 415. In an embodiment, first metadata retrieving component 410 retrieves metadata from OTT content providers 120 and second metadata retrieving component 415 retrieves metadata from second server 110, such metadata originating from OTA streamer device 150. Thus, for example, responsive to retrieving the first metadata and the second metadata, such metadata can be sent to aggregation server 115 to homogenize (e.g., conform or convert to a common format) the metadata so that such metadata may be displayed in a unified view to the end user.

First server 105 also includes a programming guide unifying component 420. Programming guide unifying component 420 collects the unified program data, from aggregator server 115 for example that originated from the disparate sources such as but not limited to OTT channels, on-demand channels, and OTA channels, and formats the program data in a presentable way for the end user. For example, programming guide unifying component 420 can list the OTT and OTA DVR recordings. OTT and OTA channels can be listed in a list ribbon as well (not shown). Or as another example, programming guide unifying component 420 can list the OTT and OTA channels in a list form on a GUIDE page.

Figure 5:
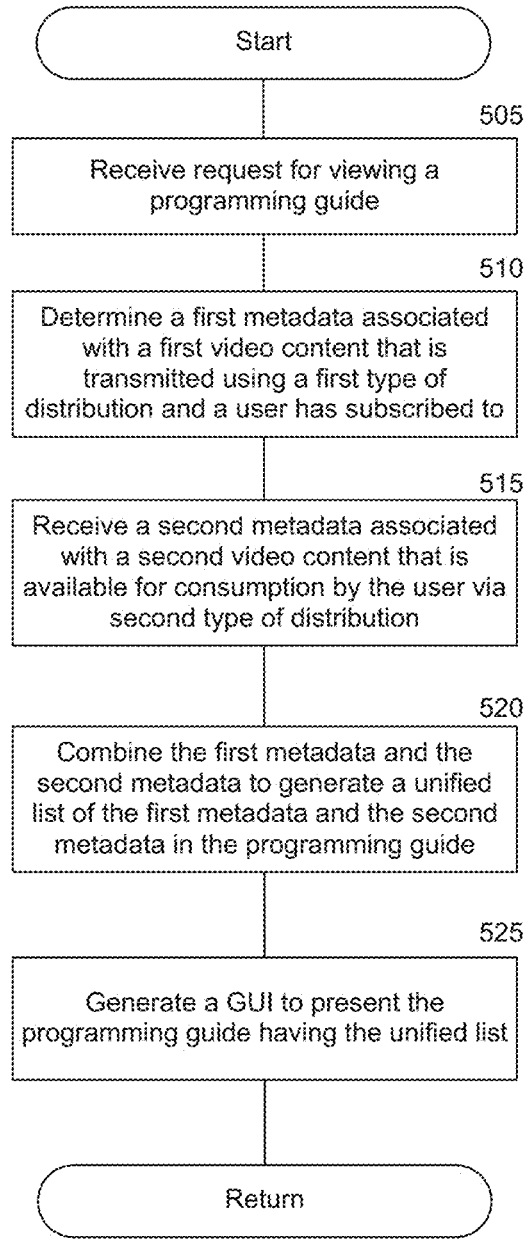
FIG. 5 is a flow diagram of an exemplary process for receiving a request for viewing a programming guide, according to an embodiment.

An embodiment can be understood with reference to FIG. 5, a flow diagram of an exemplary process for receiving a request for viewing a programming guide. At step 105, receive (e.g., at first server 105) a request (e.g., from client device 135) for viewing a programming guide. At step 510, determine (e.g., by first server 105) a first metadata associated with a first video content that is transmitted using a first type of distribution and a user has subscribed to (e.g., from content provider servers 120). At step 515, receive (e.g., at first server 105) a second metadata associated with a second video content that is available for consumption by the user via second type of distribution (e.g., from second server 110 that originated from OTA streamer device 150). At step 520, combine (e.g., by first server 105) the first metadata and the second metadata to generate a unified list of the first metadata and the second metadata in the programming guide. At step 525, generate (e.g., by first server 105) a GUI to present the programming guide having the unified list. It should be appreciated that in an embodiment, first server 105 may communicate with aggregator server 115 in one or more steps before generating the GUI to present the programming guide having the unified list. For example, aggregator server 115 may have convert the first metadata and the second metadata to the unified format and subsequently send such first metadata and second metadata in a common format to first server 105 so that first server 105 can generate the GUI having the unified list.

Figure 6:
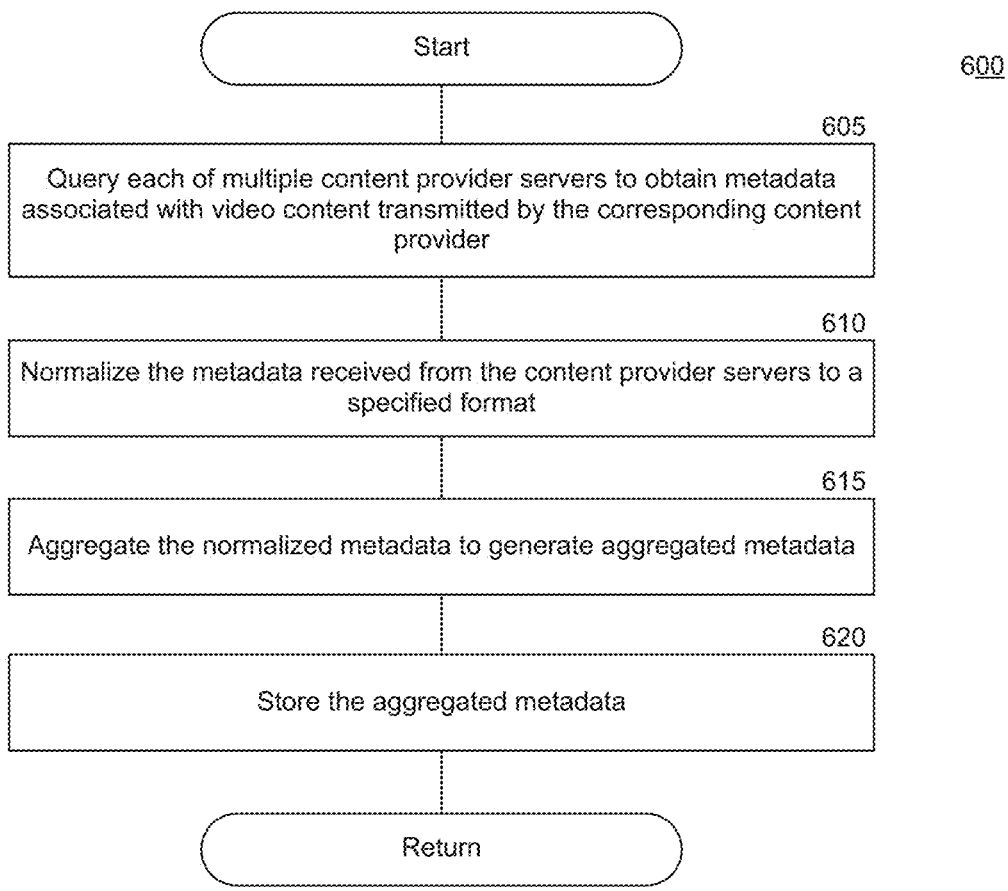
FIG. 6 is a flow diagram of an exemplary process for generating and storing aggregated metadata, according to an embodiment.

An embodiment can be understood with reference to FIG. 6, a flow diagram of an exemplary process for generating and storing aggregated metadata. At step 605, query (e.g., by aggregator server 115) each of multiple content provider servers (e.g., content provider servers 120 and/or storage device 155 via communication network 125 and communication network 130) to obtain metadata associated with video and audio content transmitted by the corresponding content provider.

At step 610, normalize (e.g., by aggregator server 115) the metadata received from the content provider servers to a specified format. For example, the metadata describing recordings from both OTT (over the top) and OTA (over the air) services are combined together into a single "ribbon" (group of recordings associated to that user) that is returned to end users, based upon (honoring) various filters that users can optionally include.

More specifically, in an embodiment, JSON objects and text commands using the recordings API (application program interface) are ingested and stored into relational database objects. Once stored in a relational structure the data is considered normalized and ready for analysis, various commands/manipulation, and aggregation. A sample of such data definition is depicted below:

```
{
    "Isdvr": "<guid hexstring>",
    "user": "<guid hexstring>",
    "total_Is_recspace": <int>,
    "free_Is_recspace": <int>,
    "protected_Is_recspace": <int>,
    "true_up": <boolean>,
    "Is_recordings": [
        {
            "guid": "<guid hexstring>",
            "state": < "<string>",
            "status_msg": <"<string>",
            "recstart": <"epoch time">,
            "recend": <"epoch time">,
            "watched": <boolean>,
            "protected": <boolean>,
            "rule_guid": "<guid hexstring>",
            "channel_id": <positive integer>,
            "channel_guid": "<guid hexstring>",
            "channel_title": <"<string>",
            "external_id": "<guid hexstring>"
            "program_id": <positive integer>,
            "program_guid": "<guid hexstring>"
            "schedule_guid": "<guid hexstring>"
            "asset_start": <"epoch time">,
            "asset_end": <"epoch time">,
            "asset_new_episode": <boolean>,
            "asset_ratings": <list>,
            "franchise_guid": "<guid hexstring>",
            "franchise_id": <positive integer>,
            "franchise_title": "<string>",
            "recspace": <positive integer>,
            "episode_title": "<episode title string>",
            "episode_season": "<positive integer>",
            "episode_number": "<positive integer>"
            "asset_thumbnail":{
                "url": "<thumbnail url>",
                "h": "<positive integer>"
                "w": "<positive integer>"
            }
            "franchise_thumbnail":{
                "url": "<thumbnail url>",
                "h": "<positive integer>",
                "w": "<positive integer>"
            }
        }, ...
    ],
}
```

At step 615, aggregate (e.g., by aggregator server 115) the normalized metadata to generate aggregated metadata. For example, the metadata describing recordings (such as title, user, channel, date, duration, episode, season, ratings, etc.) from both OTT (over the top) and OTA (over the air) services are combined together using python and SQL from our relational database into a single "ribbon" (group of recordings associated to/owned by that user) that is returned to end users, based upon (honoring) various API filters that users can optionally include. Such technique empowers end users to view OTT and OTA recordings' metadata seamlessly, without necessarily knowing or appreciating the various source of the content they are viewing or preparing to view. Another such instance of aggregation is grouping recordings into "folders" (e.g., multiple Seinfeld episodes are aggregated into a single folder to which users can navigate to select a particular episode of interest.) Various clients (e.g., Roku, android, iOS) then all get the same normalized view of such aggregated and user-specific metadata in .JSON transported securely over HTTPS.

At step 620, store (e.g., by aggregator server 115 in a corresponding storage not shown) the aggregated metadata.

Figure 7:
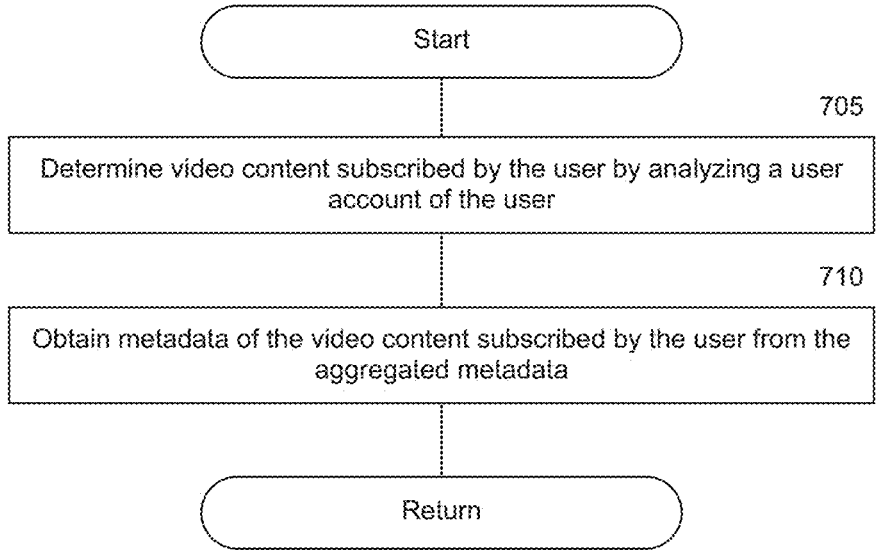
FIG. 7 is a flow diagram of an exemplary process for obtaining video content subscribed by the user, according to an embodiment.

An embodiment can be understood with reference to FIG. 7, a flow diagram of an exemplary process for obtaining video content subscribed by the user. At step 705, determine (e.g., by first server 105) video content subscribed by the user by analyzing a user account of the user. For example, in an embodiment, the user registered a user account on the system and the system generated a user profile. At step 710, obtain (e.g., by first server 105) metadata of the video content subscribed by the user from the aggregated metadata (e.g., such aggregated metadata provided by aggregation server 115).

Figure 8:
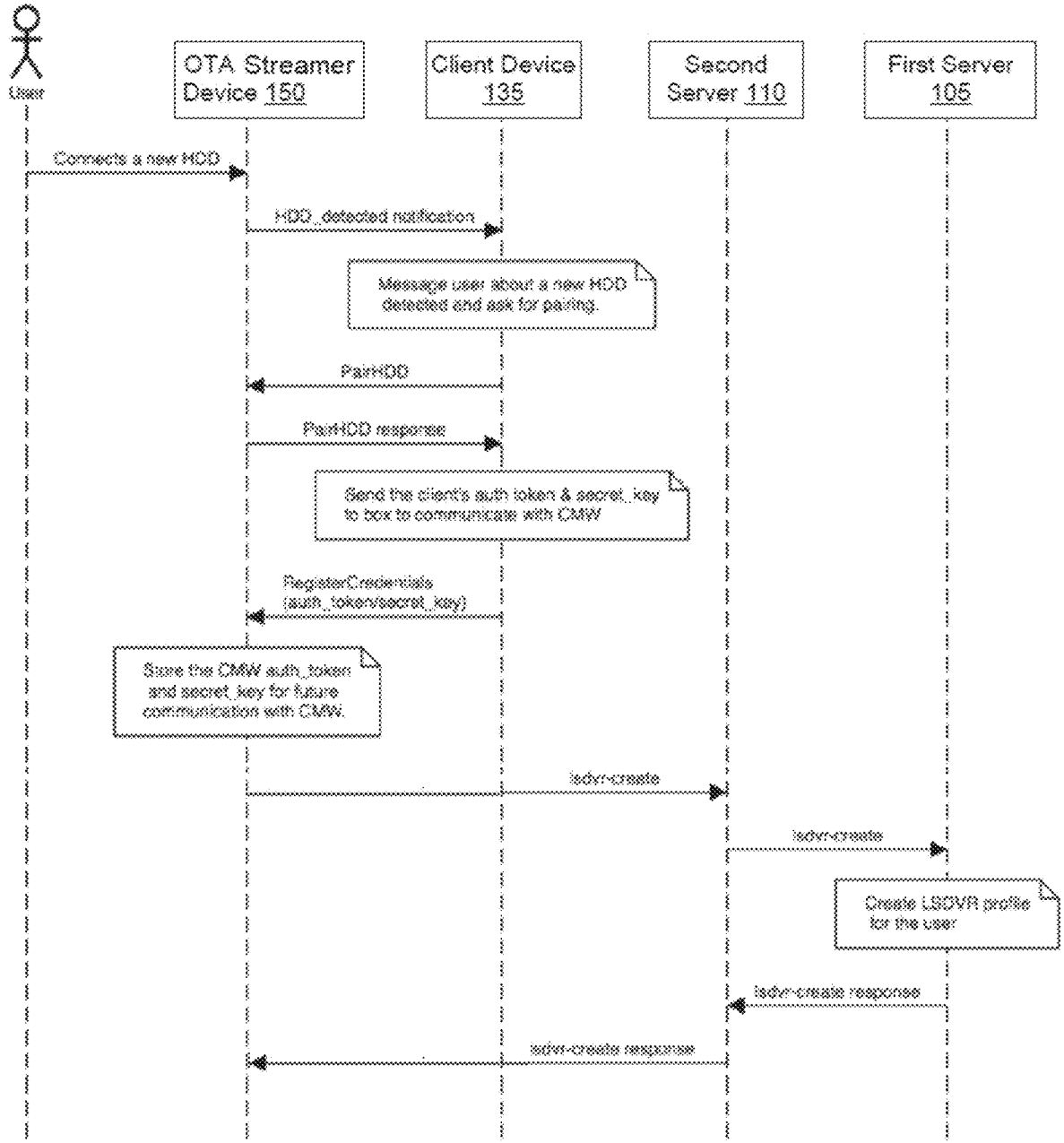
FIG. 8 is a flow diagram of an exemplary process for a user to register for OTA LS DVR capabilities, according to an embodiment.

An embodiment can be understood with reference to FIG. 8, a flow diagram of a process for a user to register for OTA LS DVR capabilities. More specifically, the user pairs a new, corresponding hardware disk drive (HDD) for the OTA DVR. Thus, the user connects a new HDD to OTA Streamer Device 150 (e.g., AirTV box). Upon detecting the connect HDD, OTA Streamer Device 150 sends a detection notification to Client Device 135 (e.g., SlingTV/Application). Client Device 135 then messages the user about detecting the new HDD by sending a message to OTA Streamer Device 150 that asks the user whether to pair. Client Device 135 then receives a response from OTA Streamer Device 150 to pair the HDD. Subsequently, Client Device 135 proceeds to send the client's authorization token and secret key to OTA Streamer Device 150 to communicate with Second Server 110 (CMW). Client Device 135 sends a RegisterCredentials message to OTA Streamer Device 150. OTA Streamer Device 150 stores the CMW credentials, e.g., authentication token and secret key, for future communication with the CMW. Then, OTA Streamer Device 150 sends a lsdvr create message via Second Server 110 (CMW) intended for First Server 105 (DVR backend) to create the LSDVR profile for the user. Responsive to receiving the create LSDVR profile message, First Server 105 creates a LSDVR profile for or corresponding to the user. Further, First Server 105 sends a response message that the profile has been created. The message is sent to Second Server 110, which further sends such message to OTA Streamer Device 150.

It should be appreciated that a process for un-registering the OTA Streamer Device 150 capabilities and, thus, the user un-pairing the paired HDD) is similar. In an embodiment, the process begins when the user unpairs the existing HDD. Thus, Client Device 135 sends a request to OTA Streamer Device 150 to un-pair the HDD. OTA Streamer Device 150 sends an un-pair response back to Client Device 135. OTA Streamer Device 150 also sends a delete command or update intended for First Server 105 via Second Server 110. First Server 105 deletes the LSDVR profile and related LS-DVR records for the user and sends a corresponding lsdvr-update response back to OTA Streamer Device 150 through Second Server 110. Upon receipt of the update response, OTA Streamer Device 150 clears the CMW credentials and disables the DVR capabilities.

Figure 9:
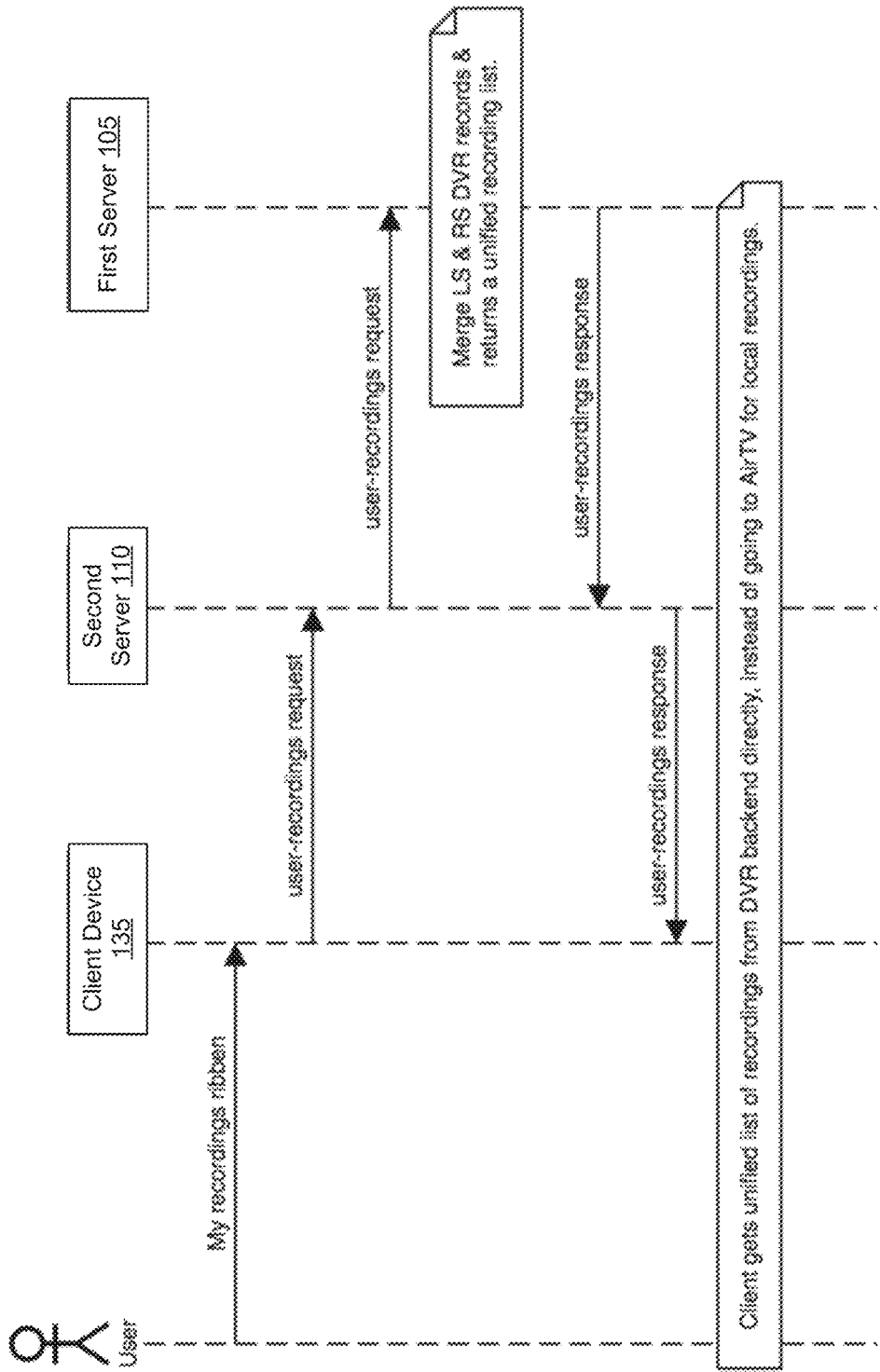
FIG. 9 is a flow diagram of an exemplary process for the client to receive the list of recordings from the DVR backend directly, instead of going to the OTA Streamer Device for local recordings, according to an embodiment.

An embodiment can be understood with reference to FIG. 9, a flow diagram of a process for the client to receive the list of recordings from the DVR backend directly, instead of going to the OTA Streamer Device 150 for local recordings. A user requests to see their listing of recorded programs. Thus, Client Device 135 receives a request from the user for the list, e.g., a ribbon request. Client Device 135 forwards the request via Second Server 110 intended for First Server 105. Responsive to receiving the request, First Server 105 merges the copies of the local storage DVR records and the remote storage DVR records and returns a unified recording list, through Second Server 110 intended for Client Device 135. Thus, Client Device 135 obtains the unified list of recordings from the DVR backend directly, rather then having to obtain one set of recordings from the cloud and the other from local storage of OTA Streamer Device 150.

Figure 10:
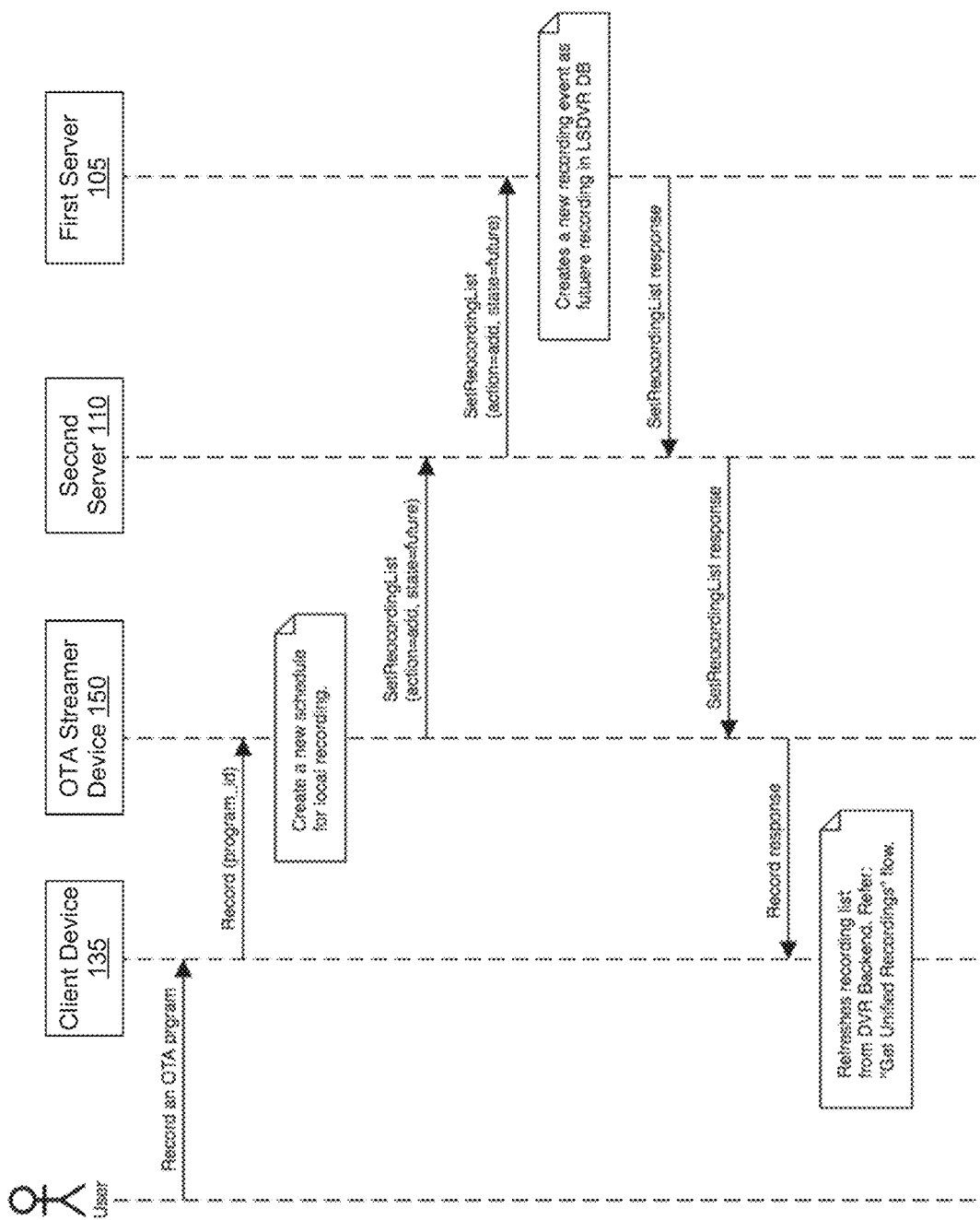
FIG. 10 is a flow diagram of an exemplary process for scheduling a recording, according to an embodiment.

An embodiment can be understood with reference to FIG. 10, a flow diagram of a process for scheduling a recording. The user provides input to Client Device 135 indicating that they desire to record an OTA program. Responsive to receiving the input (e.g., a record command with the program identifier as a parameter), OTA Streamer Device 150 creates a new schedule for the corresponding local recording. Further, OTA Streamer Device 150 sends a set recordings message via Second Server 110 intended for First Server 105. The set recordings message includes the action (e.g., add) and the state (e.g., future). Responsive to receiving the set recordings message, First Server 105 creates a new recording event as a future recording in the LSDVR database. Further, First Server 105 sends a set recording list response via Second Server 110 intended for OTA Streamer Device 150. Responsive to receiving the set recording list response, OTA Streamer Device 150 sends a record response to Client Device 135. Responsive to receiving the record response, Client Device 135 refreshes the record list.

It should be appreciated that the process for deleting a local DVR recording or schedule is similar. In an embodiment, the user checks a DVR recording or schedule and attempts to delete it. Delete recording user input is received at Client Device 135, which sends a delete recording message to OTA Streamer Device 150. OTA Streamer Device 150 checks and marks the recording or schedule for deletion. OTA Streamer Device 150 sends a set recordings list message with the parameter: action=delete to First Server 105 through Second Server 110. First Server 105 deletes the recording from the LSDVR database and sends a set recordings list response via Second Server 110 to OTA Streamer Device 150. OTA Streamer Device 150 sends a delete recording response to Client Device 125, which refreshes the DVR listing.

An embodiment includes a process for DVR event recording at OTA Streamer Device 150 (e.g., AirTV box). A schedule event starts recording at Client Device 150. Client Device 150 sends a set recordings list message intended for First Server 105 via Second Server 110. The parameters of such message are action=update and state=in progress. Responsive to receiving the message, First Server 105 updates the existing future recording with state as recording-in-progress in the LSDVR database. Further, First Server 105 sends a set recording list response via Second Server 110 to OTA Streamer Device 150, which, upon receipt, records the program until such program completes or ends due to an error. OTA Streamer Device 150 subsequently sends a set recording list message intended for First Server 105 via Second Server 110. The parameters of such message are action=update and state=complete. Responsive to receiving such message, First Server 105 updates the existing recording entry with state as complete and sends a corresponding set recording list response via Second Server 110 back to OTA Streamer Device 150.

Further Exemplary Embodiments

In an embodiment, a hybrid approach enables OTA device clients to have a unified User Interface for displaying and managing both the RS (OTT) and LS (OTA) DVR and provides seamless user experience. The remote versus local DVRs can be represented with different icons on the UI to identify the source of recording.

In one or more embodiments, any of the followings features or any combination of the following features may be included:

The OTA device manages the DVR recordings, schedules, timers etc. locally and integrates the EPG locally for handling the periodic schedules.

The OTA device updates its recordings and schedules, to DVR backend (through CMW) to keep the DVR backend up to date with all its local changes.

the OTT client passes its cached auth token and secret keys to the OTA device. The OTA device uses these to authenticate with CMW backend and call LSDVR API.

The DVR Backend maintains the listing and metadata for the recordings, schedules for the associated user's registered OTA device box and maintains such data based on information provided by the OTA device.

The DVR backend provides a unified listing of recordings including RS (OTT) and LS (OTA) to clients to have a unified user experience on the client.

The OTT client application fetches the DVR recording and schedules from the DVR backend using the same APIs as used for RS-DVR. The recording API may have the option to fetch local vs remote recordings as fallback to clients where Local DVR is not supported.

OTT clients may communicate directly to the OTA device to manage (e.g., create/update/delete) the schedules (e.g., timers) and recordings through OTA Client Software Development Kit (SDK) APIs, as opposed to using RS-DVR APIs.

OTT clients handle the user HDD pairing and on successfully pairing register the LSDVR with DVR backend using suitable APIs. In an embodiment, the OTA Streamer box performs the registration.

OTT clients may be notified (through the SDK) and may handle any conflict scenarios occurred due to limited tuner availability, e.g., conflicts in recording due to more than two overlapping program schedules or conflict in streaming due to multiple recordings in progress, etc. An embodiment includes calling out conflicts that arise when recording requests are more than available to the tuner in the OTA streamer box for a given time.

OTT clients may play the DVR recordings directly from the OTA device box using the SDK APIs; which is similar to tuning to an OTA channel using the SDK APIs.

In one or more embodiments, any of the followings logical APIs or any combination of the following features may be included. It should be appreciated that the specific details are for illustrative purposes and are not meant to be limiting.

1) Register OTA LSDVR (/Rec/v1/lsdvr-Create/)

This API registers LSDVR capabilities and will create LSDVR profile for the user by assigning it a DVR site (similar to RSDVR). This will be called immediately after the OTT application APP successfully completes HDD pairing with the OTA streamer device box.

The request sends the details of OTA streamer device box and HDD, including the storage capability. DVR backend creates a LSDVR profile and LSDVR database for the user's registered OTA streamer device box.

It an embodiment, the credentials include a box ID, the user's, ZipCode, HDD information, etc.

2) De-Register OTA LSDVR (/Rec/v1/lsdvr-Deregister/)

This API will be called when a paired HDD is unpaired by the user using the OTT application. The DVR backend erases the data related to LSDVR recordings and schedules maintained in its database for the associated user.

3) Activate/Deactivate OTA LSDVR (/Rec/v1/lsdvr-Update/)

This API provides the HDD connected/disconnected state and HDD volume statistics to the DVR backend. The API may be called immediately after paired HDD is disconnected or re-connected from the box. This is to inform user that the HDD is not currently connected to the box and the user cannot record/watch LSDVR temporarily. This is a separate state than registration for LSDVR and DVR Cloud, which may retain all recordings and schedules in the database with state as HDD disconnected.

4) Set Recordings List (Includes Both Recordings and Schedules and Requires a New LSDVR API)

This API sends the status of a recording and schedules to the DVR backend. The DVR backend updates the LSDVR recordings entry based on this API.

The API may be called immediately at any of following use cases:

1. Create timer for recordings resulting in new schedules/conflicts—single/series recordings ('add' entry)
2. Modifying recording schedules—single to series of episodes, scheduled to skip state, conflict to schedule state, skip to scheduled state, etc. ('modify' entry)
3. Delete of schedule entry when recording starts, schedule expiry, etc. ('delete' entry)

The API may be called immediately at any of following use cases:

1. Start of scheduled recording ('add' entry)
2. Complete/stop/failure of scheduled recording ('modify' entry)
3. Delete of recording event(s) ('delete' entry)
4. Modification of protect/unprotect flag of recording event(s) ('modify' entry)
5. Modification of DVR event remaining time, etc ('modify' entry)

In an embodiment, a single API with actions {'add', 'modify', 'delete'} is provided. The API may be capable of having multiple entries in the request. The API response may have successes and possible failures enumerated, e.g., entry doesn't exist, db update error, etc. In case of failures, a retry may be attempted by the box automatically and possibly in an exponential manner.

5) Create/Update/Delete Recording Rules (a New LSDVR API)

This API will send the series recording (timer) information to DVR backend (create/delete). The DVR backend may require this information to update the clients with required rule information. Clients may show options to cancel series recording based on rules information.

6) Cleanup and Refresh (a New LSDVR API)

This API refreshes the DVR backend data with new data from the OTA streamer device box. Such API may be a separate API or may be implemented in the setrecordinglist API.

In an embodiment, the DVR backend stores the data in single table and a single API is employed. Further, any changes are updated in the API specifications.

Figure 11:
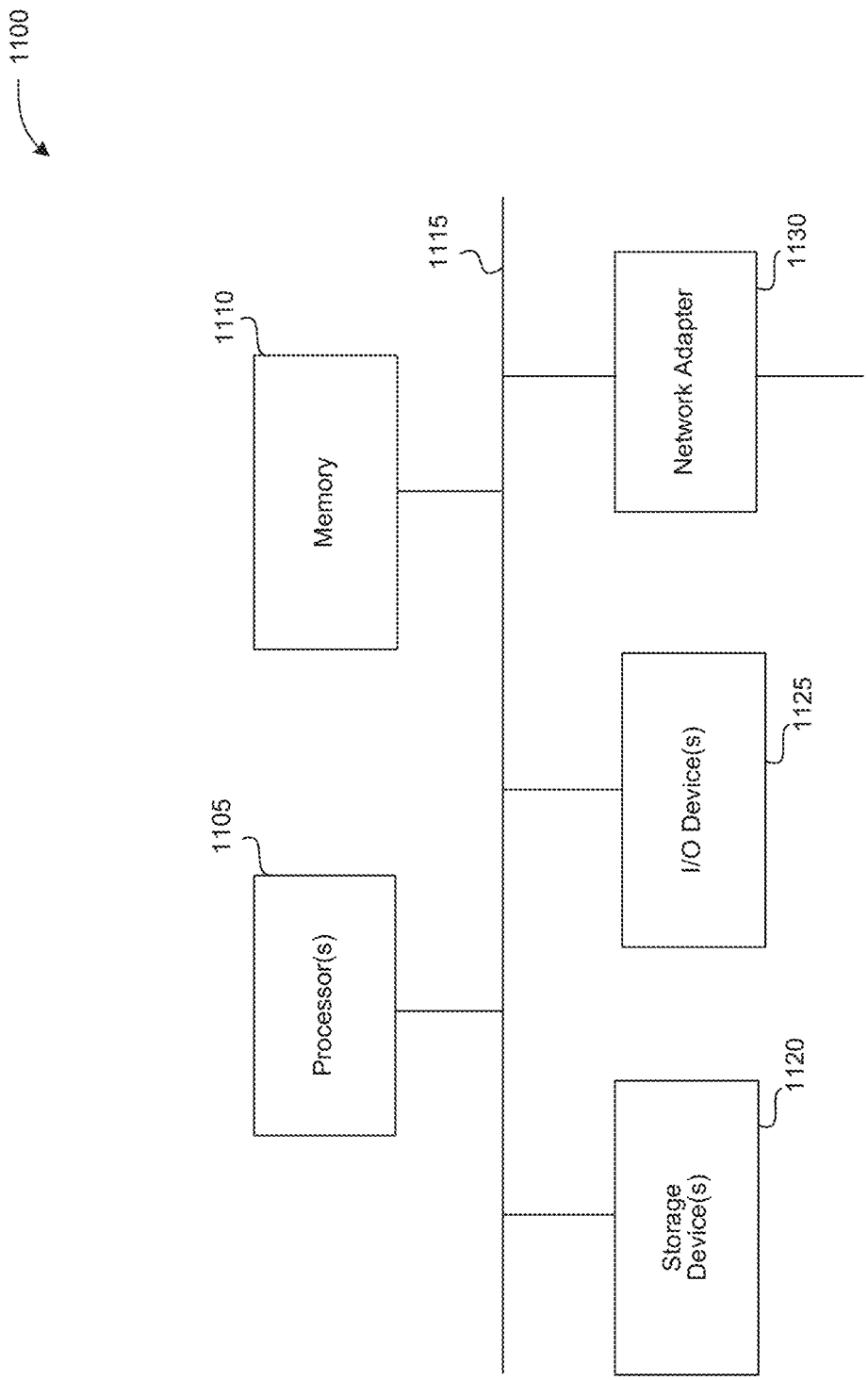
FIG. 11 is a block diagram of a processing system that can implement operations of the disclosed embodiments.

FIG. 11 is a block diagram of a computer system as may be used to implement features of the disclosed embodiments. The computer system 1100 may be used to implement any of the entities, components or services depicted in the examples of the foregoing figures (and any other components described in this specification). The computer system 1100 may include one or more central processing units ("processors") 1105, memory 1110, input/output devices 1125 (e.g., keyboard and pointing devices, display devices), storage devices 1120 (e.g., disk drives), and network adapters 1130 (e.g., network interfaces) that are connected to an interconnect 1115. The interconnect 1115 is illustrated as an abstraction that represents any one or more separate physical buses, point to point connections, or both connected by appropriate bridges, adapters, or controllers. The interconnect 1115, therefore, may include, for example, a system bus, a Peripheral Component Interconnect (PCI) bus or PCI-Express bus, a HyperTransport or industry standard architecture (ISA) bus, a small computer system interface (SCSI) bus, a universal serial bus (USB), IIC (I2C) bus, or an Institute of Electrical and Electronics Components (IEEE) standard 1394 bus, also called "Firewire".

The memory 1110 and storage devices 1120 are computer-readable storage media that may store instructions that implement at least portions of the described embodiments. In addition, the data structures and message structures may be stored or transmitted via a data transmission medium, such as a signal on a communications link. Various communications links may be used, such as the Internet, a local area network, a wide area network, or a point-to-point dial-up connection. Thus, computer readable media can include computer-readable storage media (e.g., "non-transitory" media) and computer-readable transmission media.

The instructions stored in memory 1110 can be implemented as software and/or firmware to program the processor(s) 1105 to carry out actions described above. In some embodiments, such software or firmware may be initially provided to the computer system 1100 by downloading it from a remote system through the computer system 1100 (e.g., via network adapter 1130).

The embodiments introduced herein can be implemented by, for example, programmable circuitry (e.g., one or more microprocessors) programmed with software and/or firmware, or entirely in special-purpose hardwired (non-programmable) circuitry, or in a combination of such forms. Special-purpose hardwired circuitry may be in the form of, for example, one or more ASICs, PLDs, FPGAs, etc.

Remarks

The above description and drawings are illustrative and are not to be construed as limiting. Numerous specific details are described to provide a thorough understanding of the disclosure. However, in some instances, well-known details are not described in order to avoid obscuring the description. Further, various modifications may be made without deviating from the scope of the embodiments. Accordingly, the embodiments are not limited except as by the appended claims.

Reference in this specification to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not for other embodiments.

The terms used in this specification generally have their ordinary meanings in the art, within the context of the disclosure, and in the specific context where each term is used. Terms that are used to describe the disclosure are discussed below, or elsewhere in the specification, to provide additional guidance to the practitioner regarding the description of the disclosure. For convenience, some terms may be highlighted, for example using italics and/or quotation marks. The use of highlighting has no influence on the scope and meaning of a term; the scope and meaning of a term is the same, in the same context, whether or not it is highlighted. It will be appreciated that the same thing can be said in more than one way. One will recognize that "memory" is one form of a "storage" and that the terms may on occasion be used interchangeably.

Consequently, alternative language and synonyms may be used for any one or more of the terms discussed herein, nor is any special significance to be placed upon whether or not a term is elaborated or discussed herein. Synonyms for some terms are provided. A recital of one or more synonyms does not exclude the use of other synonyms. The use of examples anywhere in this specification including examples of any term discussed herein is illustrative only, and is not intended to further limit the scope and meaning of the disclosure or of any exemplified term. Likewise, the disclosure is not limited to various embodiments given in this specification.

Those skilled in the art will appreciate that the logic illustrated in each of the flow diagrams discussed above, may be altered in various ways. For example, the order of the logic may be rearranged, substeps may be performed in parallel, illustrated logic may be omitted; other logic may be included, etc.

Without intent to further limit the scope of the disclosure, examples of instruments, apparatus, methods and their related results according to the embodiments of the present disclosure are given below. Note that titles or subtitles may be used in the examples for convenience of a reader, which in no way should limit the scope of the disclosure. Unless otherwise defined, all technical and scientific terms used herein have the same meaning as commonly understood by one of ordinary skill in the art to which this disclosure pertains. In the case of conflict, the present document, including definitions will control.

We claim:

1. A method, comprising:
   determining, at a first server, a first metadata associated with a first video content subscribed to by a user, wherein the first video content includes over-the-top (OTT) video content;
   determining, by the first server, if a user account associated with the user is linked to a client device that is capable of receiving over-the-air (OTA) video content;
   in response to determining that the user account is linked to the client device, retrieving, at the first server via a second server, a second metadata associated with a second video content available for consumption by the user, wherein the second video content includes OTA video content;
   processing a user request for managing recording of the OTA video content by:
     creating, by an OTA streamer device associated with the user, a recording schedule for a recording a program from the OTA video content,
     transmitting, by the OTA streamer device, the recording schedule to the second server, and
     receiving, by the first server, the recording schedule from the second server for including the recording schedule in a unified listing that includes a listing of programs from both the OTT video content and the OTA video content;
   combining, at the first server, the first metadata with the second metadata to include in the unified listing; and
   displaying, at a client device associated with the user, a graphical user interface (GUI) to present the unified listing.

2. The method of claim 1, wherein determining the first metadata includes:
receiving, at a content aggregation server and from each of multiple content providers, metadata associated with video content distributed by each of the multiple content providers,
aggregating, by the content aggregation server, the received metadata to generate aggregated metadata, and
determining, by the first server and from the aggregated metadata, the first metadata of the first video content subscribed to by the user.

3. The method of claim 1, wherein the second metadata is received at the second server via an OTA streamer device associated with the user.

4. The method of claim 3, further comprising:
registering the OTA streamer device with a user account of the user, wherein the user account is associated with a video streaming service,
transmitting, by the client device, information associated with the user account to the OTA streamer device, and
authenticating, using the information associated with the user account, the OTA streamer device with the second server.

5. The method of claim 1, further comprising:
generating in the unified listing an indicator in association with a program in the unified listing, wherein the indicator indicates that the program is from the OTA video content.

6. The method of claim 1, further comprising:
generating, by an OTA streamer device, a first list of the OTA video content; and
transmitting, by the OTA streamer device, the first list to the second server for further transmission to the first server.

7. The method of claim 1, further comprising:
receiving, at the first server, a first list from the second server, wherein the first list includes metadata associated with the OTA video content;
retrieving, by the first server, a second list, wherein the second list includes metadata associated with the OTT video content accessible to the user; and
combining the first list with the second list to generate a unified listing.

8. The method of claim 7, further comprising:
presenting, at the client device, the unified listing in the GUI that displays information regarding programs corresponding to the first list and the second list.

9. The method of claim 8, further comprising:
generating in the unified listing an indicator in association with a program in the unified listing, wherein the indicator indicates that the program is from the OTA video content.

10. The method of claim 8, further comprising:
receiving, at the client device, a user selection of a first OTA video content from the unified listing;
transmitting, by the client device, a request to the OTA streamer device to play the first OTA video content; and
processing, by the OTA streamer device, the request to play the first OTA video content on a presentation device associated with the client device.

11. The method of claim 1, further comprising:
receiving, by the client device, the user request for managing recording of the OTA video content.

12. The method of claim 11, wherein processing the user request for managing the recording of the OTA video content includes:
storing the recorded OTA video content in a storage device associated with the OTA streamer device.

13. The method of claim 11, wherein receiving the user request for managing the recording of the OTA video content includes:
detecting a storage device connected to the OTA streamer device, wherein the storage device is configured to store recordings of the OTA video content,
registering the storage device with a user account of the user, the user account associated with a video streaming service,
transmitting, by the client device, information associated with the user account to the OTA streamer device, and
storing, at the OTA streamer device, information associated with the user account.

14. The method of claim 1, wherein the client device includes a video streaming service for streaming at least the first video content to the user.

15. A non-transitory computer-readable storage medium storing computer-readable instructions, comprising:
instructions for receiving, at a client device and from a user, a request for accessing a unified listing of video content, wherein the video content includes a first video content that is transmitted by content providers using a first type of distribution and a second video content that is transmitted by content providers using a second type of distribution, wherein the first video content includes over-the-top (OTT) video content and wherein the second video content includes over-the-air (OTA) video content;
instructions for transmitting the request from the client device to a first server for obtaining the unified listing of video content;
instructions for retrieving, by the first server, a first program listing of the first video content, wherein the first program listing is obtained from a content aggregation server that aggregates program listings from multiple content providers;
instructions for determining, by the first server, if a user account associated with the user is linked to a second client device that is capable of receiving the second video content;
instructions for, in response to determining that the user account is linked to the second client device, retrieving a second program listing of the second video content from a second server connected to the second client device;
instructions for processing a user request for managing recording of the OTA video content by:
creating a recording schedule for a recording a program from the OTA video content,
causing an OTA streamer device associated with the user to transmit the recording schedule to the second server, and
receiving, by the first server, the recording schedule from the second server for including the recording schedule in the unified listing of video content;
instructions for combining, by the first server, the first program listing with the second program listing to generate the unified listing of video content, wherein the unified listing includes a listing of programs from both the OTT video content and the OTA video content; and
instructions for transmitting, by the first server, the unified listing of video content to the client device for presentation on a presentation device associated with the client device.

16. The non-transitory computer-readable storage medium of claim 15, wherein the first video content is OTT video content and the first type of distribution is OTT distribution.

17. The non-transitory computer-readable storage medium of claim 15, wherein the second video content is OTA video content and the second type of distribution is OTA distribution.

18. The non-transitory computer-readable storage medium of claim 15, wherein the first program listing includes information regarding a name of a program and a start time of the program for each program of the first video content, and wherein the second program listing includes information regarding a name of a program and a start time of the program for each program of the second video content.

19. The non-transitory computer-readable storage medium of claim 15, wherein the instructions for transmitting the unified listing of video content to the client device include:
instructions for generating a GUI for presenting the unified listing on the presentation device, wherein the GUI includes an indicator in association with each program in the second program listing, wherein the indicator indicates that a particular corresponding program is from the second video content.

20. A system, comprising:
a first component configured to receive, from a client device associated with a user, a request for accessing a unified listing of video content, wherein the video content includes a first video content that is transmitted by content providers using a first type of distribution and a second video content that is transmitted by content providers using a second type of distribution, wherein the first video content includes over-the-top (OTT) video content and wherein the second video content includes over-the-air (OTA) video content;
a second component configured to retrieve, from a content aggregation server, a first program listing of the first video content, wherein the first video content is a subset of video content whose program listings are aggregated by the content aggregation server, wherein the first video content is a subset of the video content subscribed by the user;
a third component to retrieve, if a user account associated with the user is linked to a second client device that is capable of receiving the second video content, a second program listing of the second video content from a second server connected to the second client device;
a fourth component to:
process a user request for managing recording of the OTA video content by performing operations to:
create a recording schedule for a recording a program from the OTA video content,
cause an OTA streamer device associated with the user to transmit the recording schedule to the second server, and
receive the recording schedule from the second server for including the recording schedule in the unified listing of video content;
combine the first program listing with the second program listing to generate the unified listing of video content, wherein the unified listing includes a listing of programs from both the OTT video content and the OTA video content; and
a fifth component to transmit the unified listing of video content to the client device for presentation on a presentation device associated with the client device;
wherein at least one of the components resides in a cloud DVR.

* * * * *